United States Patent
Flores et al.

(10) Patent No.: US 10,555,044 B2
(45) Date of Patent: Feb. 4, 2020

(54) SYSTEMS AND METHODS FOR CONTROL OF CHANNEL SURFING

(71) Applicant: SONY INTERACTIVE ENTERTAINMENT LLC, San Mateo, CA (US)

(72) Inventors: Prisciliano Flores, Spring Valley, CA (US); Charles McCoy, Coronado, CA (US); True Xiong, San Diego, CA (US); Yuqian Zhao, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 123 days.

(21) Appl. No.: 14/525,003

(22) Filed: Oct. 27, 2014

(65) Prior Publication Data

US 2016/0119684 A1    Apr. 28, 2016

(51) Int. Cl.
*H04N 21/482* (2011.01)
*H04N 21/475* (2011.01)
*H04N 21/466* (2011.01)

(52) U.S. Cl.
CPC ..... *H04N 21/4826* (2013.01); *H04N 21/4668* (2013.01); *H04N 21/4755* (2013.01)

(58) Field of Classification Search
CPC ...... H04N 21/25; H04N 21/251; H04N 21/45; H04N 21/466; H04N 21/4668
See application file for complete search history.

(56) References Cited

U.S. PATENT DOCUMENTS

| | | | |
|---|---|---|---|
| 7,434,246 B2 | 10/2008 | Florence | |
| 2002/0059584 A1* | 5/2002 | Ferman | G06F 17/30017 725/34 |
| 2002/0152224 A1* | 10/2002 | Roth | H04N 5/44543 |
| 2002/0199185 A1* | 12/2002 | Kaminski | H04N 5/76 725/25 |
| 2003/0115589 A1* | 6/2003 | D'Souza | H04H 60/43 725/10 |
| 2004/0154040 A1* | 8/2004 | Ellis | H04N 5/44543 725/58 |
| 2005/0240967 A1* | 10/2005 | Anderson | H04N 5/50 725/52 |
| 2006/0282856 A1* | 12/2006 | Errico | G06F 17/30035 725/46 |
| 2012/0263431 A1* | 10/2012 | Ebina | H04N 21/4826 386/230 |

(Continued)

OTHER PUBLICATIONS

"NAVAL Goes on Angry SuperBowl Tweetstorm".*

*Primary Examiner* — Fernando Alcon
(74) *Attorney, Agent, or Firm* — Mayer & Williams, PC

(57) ABSTRACT

Systems and methods described provide ways to order channels surfed such that channels of likely greater interest to the user are presented to the user first, and channels of lesser interest are presented after. For examples, channels showing popular programs may be placed higher in a channel surfing lineup. The systems and methods may also take account of channels that are showing commercials during a time of channel surfing, and may skip over the same while surfing and/or may come back to the channel, or re-place or otherwise include the channel in the surfing lineup, at such time as the commercial has ended and regular programming has continued.

17 Claims, 8 Drawing Sheets

(56) References Cited

U.S. PATENT DOCUMENTS

| | | | |
|---|---|---|---|
| 2013/0081084 A1* | 3/2013 | Scheer | H04N 21/2408 |
| | | | 725/46 |
| 2013/0219419 A1 | 8/2013 | Silver et al. | |
| 2013/0291019 A1* | 10/2013 | Burkitt | H04N 21/4828 |
| | | | 725/53 |
| 2013/0311408 A1 | 11/2013 | Bagga et al. | |
| 2014/0317660 A1* | 10/2014 | Cheung | H04N 21/6175 |
| | | | 725/44 |

* cited by examiner

US 10,555,044 B2

SYSTEMS AND METHODS FOR CONTROL OF CHANNEL SURFING

FIELD

The invention relates to the field of user interfaces for television, and in particular for channel control.

BACKGROUND

Television viewers commonly do not know what is on television at a given time and wish to just browse or "channel surf" to see what is on rather than look up their programming guide. This allows viewers to see snippets of various programs that are currently being broadcast. Traditionally this is performed by pressing the "channel up" button on a television, cable box, or satellite receiver remote control. This results in the channels being cycled through in the numerical order assigned by the FCC, cable company, or satellite company. The channel numbering is usually set by a cable or satellite company based on business decisions, e.g., to locate all of the major networks clustered in the lower channels.

In some systems, users can mark channels as favorites and then only channel surf through the channels marked as favorites. This helps in that some channels that the viewer never watches, such as shopping channels, preview channels, or channels not in the viewer's native language, are excluded in the surfing. However, this has a drawback in that the set of channels the user marked as favorites is usually a small subset of the overall set of channels, so the majority of the content is not included in the channel surfing. Moreover, the order of channels is still restricted to be numerical.

Even if channel surfing is limited to channels marked as favorites, many users are annoyed when channel surfing if they channel surf to a channel showing a commercial, in which case the user cannot determine the programming on the channel. The user can continue channel surfing, but until the channel is reached again while surfing, the user is unaware of content available on the channel.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles meet the needs of the above in several ways. For example, systems and methods according to present principles provide ways to order channels surfed such that channels of likely greater interest to the user are presented to the user first, and channels of lesser interest are presented after. For examples, channels showing popular programs may be placed higher in a channel surfing lineup.

Systems and methods according to present principles also may take account of channels that are showing commercials during a time of channel surfing, and may skip over the same while surfing and/or may come back to the channel, or re-place or otherwise include the channel in the surfing lineup, at such time as the commercial has ended and regular programming has continued.

In another implementation, systems and methods according to present principles may make use of guide data in the determination of a channel surfing lineup. The guide data may provide data and metadata to the channel surfing system for use in determining a prioritization or order of channels in a channel surfing lineup, e.g., by use of data such as genres of interest to the user, shows previously seen by the user, and so on.

In one aspect, the invention is directed towards a method of providing a channel surfing functionality in which a channel controller controls a subsequent channel to be presented to a user when the user is channel surfing, including: during playback of streaming data on a content playback device, receiving at a channel controller popularity data about absolute or relative popularity of one or more channels constituting streaming data available to a user when channel surfing; receiving data at the channel controller, the data constituting a request to navigate to a subsequent channel on the content playback device, the subsequent channel streaming data for playback on the content playback device; within the channel controller, using the received popularity data in the determination of data constituting a prioritized list of one or more channels, whereby the data constituting the prioritized list of one or more channels describes data about an order of channels determined to be of likely interest of a user; within the channel controller, selecting a subsequent channel to be navigated to based on the prioritized list of one or more channels; and using the channel controller, navigating to the selected channel and displaying streaming data associated with the selected channel on the content playback device.

Implementations of the invention may include one or more of the following. The prioritized list may contain only one channel. The popularity may be based on an overall popularity of the channel over a period of time. The popularity may also be based on a current popularity of the channel, the current popularity determined while the channel is displaying a given content item. The method may further include basing an order of the prioritized list on a status of playback of content items being displayed by the respective channels. The status of playback may be based on a combination of system clock data, guide data, and metadata about a time remaining or time elapsed in the playback of the content item, or on an indication from a server that a number of systems viewing the channel has increased by at least a predetermined percentage. The method may further include basing an order of the prioritized list on a selected content type. In some cases, a user may be currently watching a channel, and data may be received at the channel controller about content preferences of other viewers watching the currently watched channel, and in these cases the content type may be determined by aggregating content type preferences of the other viewers watching the currently-watched channel. The navigating may include navigating from a cable, satellite, or over-the-air broadcast channel to a streaming internet broadcast channel or vice versa. Where the user is currently watching a channel, the method may further include displaying information about a subsequent channel in the prioritized list. The popularity may be based on historical statistics data or rating services data, or may be based on data received from a social networking site. The method may further include basing an order of the prioritized list on demographics of the user. The method may further include receiving user preferences data at the channel controller, and basing an order of the prioritized list on user preferences. The user preferences may include one or more selected from the following group: a user indication of a desire to not channel surf to channels playing a content item past a predetermined point in the duration of the content item; a user indication of a desire to see content items of a predetermined genre; or a user indication of a desire to not see content items of a predetermined genre. The user indication may be received contemporaneously with a channel surfing session, or maybe received prior to a channel surfing session. The user preferences may also be determined by user content consumption analysis, including analysis of channels frequently watched by the user.

If the subsequent channel is displaying a commercial, then the method may further include skipping the subsequent channel and determining a next subsequent channel to navigate to, and repeating the steps of: determining if the next subsequent channel is displaying a commercial; and if the next subsequent channel is not displaying a commercial, then navigating to the next subsequent channel. The popularity data may be received from a server coupled to other systems running a method of providing channel surfing functionality.

In another aspect, the invention is directed towards a method of providing a channel surfing functionality in which a controller controls a subsequent channel to be presented to a user when the user is channel surfing, including: during playback of streaming data on a content playback device, receiving data at a channel controller, the data corresponding to a request to navigate to a subsequent channel; at the channel controller determining a subsequent channel to be navigated to; at the channel controller, receiving data about the determined subsequent channel, and using the received data about the subsequent channel to determine if the subsequent channel is displaying a commercial; and if the subsequent channel is not displaying a commercial, then navigating to the subsequent channel, and if the subsequent channel is displaying a commercial, then skipping the subsequent channel in determining a next subsequent channel to navigate to, and repeating the steps of: determining if the next subsequent channel is displaying a commercial; and if the next subsequent channel is not displaying a commercial, then navigating to the next subsequent channel.

Implementations of the invention may include one or more of the following. The method may further include basing the determining of a subsequent channel to navigate to at least in part on the popularity of the channel. The basing may include: receiving popularity data about absolute or relative popularity of one or more channels available to a user when channel surfing; using the received popularity data in the determination of a prioritized list of one or more channels, whereby the prioritized list of one or more channels describes a list of channels in an order determined to be of likely interest of a user; and where the determining of a subsequent channel to navigate to is based at least in part on the prioritized list of one or more channels. The method may further include, after the skipping step, and after a predetermined time has elapsed, determining that the skipped channel is the next subsequent channel to navigate to. The predetermined time may be, e.g., between 10 and 20 seconds, between 25 and 35 seconds, or determined by user input. For example, the user input may be at least partially based on the duration of a button press on a remote control (or a user interface of a device acting as a remote control, e.g., a smart phone, tablet, laptop, or the like). The method may further include basing the determining of a subsequent channel to navigate to at least in part on a numeric order of the channels. The determining if the subsequent channel is displaying a commercial may further include determining if a predetermined proportion of other users indicated that a subsequent channel is displaying a commercial. And the determining if a predetermined proportion of other users indicated that the subsequent channel is displaying a commercial may further include determining if a predetermined number, percentage, ratio, or proportion of other users activated a commercial button on a remote control (or a user interface of a device acting as a remote control, e.g., a smart phone, tablet, laptop, or the like). The determination of the next subsequent channel may be at least in part based on metadata associated with the channel displaying a commercial. The method may further include receiving metadata from a source selected from the group consisting of: a network source including a program listing in a programming guide; a network source sourcing a broadcast signal associated with the channel; at least one network source providing aggregate data from a subset of other users, the subset defined by other users who skipped over the channel; or combinations of the above.

In another aspect, the invention is directed towards a method of providing a channel surfing functionality in which a channel controller controls a subsequent channel to be presented to a user when the user is channel surfing, including: during playback of streaming data on a content playback device, receiving data at a channel controller, the data corresponding to a request to navigate to a first subsequent channel; at the channel controller, determining a first subsequent channel to be navigated to; at the channel controller, navigating to the first subsequent channel; at the channel controller, receiving a signal indicating user desire to delay subsequent navigation to the first subsequent channel for a predetermined time; at the channel controller, determining a second subsequent channel to be navigated to; at the channel controller, navigating to the second subsequent channel; and at the end of the duration of the predetermined time, and upon reception of a request at the channel controller to navigate to a subsequent channel, navigating to the first subsequent channel.

Implementations of the invention may include one or more of the following. The predetermined time may be, e.g., between 10 and 20 seconds, between 25 and 35 seconds, or determined by user input. For example, the user input may be at least partially based on the duration of a button press on a remote control. The predetermined time may also be based at least partially on a time remaining in a program being displayed on the first subsequent channel. The method may further include basing the determining of a subsequent first or second channel to navigate to at least in part on the popularity of the first or second channel. And the basing may further include: receiving popularity data about absolute or relative popularity of one or more channels available to a user when channel surfing; and using the received popularity data in the determination of a prioritized list of one or more channels, whereby the prioritized list of one or more channels describes a list of channels in an order determined to be of likely interest of a user; and where the determining of a subsequent channel to navigate to is based at least in part on the prioritized list of one or more channels. The method may further include basing the determining of a first or second subsequent channel to navigate to at least in part on a numeric order of the channels, where the determination of the first or second subsequent channel is based at least in part on metadata associated with a broadcast occurring on the channel. The method may further include receiving metadata from a source selected from the group consisting of: a program listing in a programming guide; a broadcast signal associated with the channel; aggregate data from a subset of other users, the subset defined by other users who skipped over the channel; or combinations of the above.

In another aspect, the invention is directed towards a method of providing a channel surfing functionality in which a channel controller controls a subsequent channel to be presented to a user when the user is channel surfing, including: during playback of streamed data on a content playback device, receiving or retrieving guide data from a server about one or more channels available to a user when channel surfing; at the channel controller, receiving a request to navigate to a subsequent channel; at the channel controller, using the received or retrieved guide data in the determination of data corresponding to a prioritized list of one or more channels, whereby the prioritized list of one or more channels describes a list of channels in an order determined to be of likely interest of a user; at the channel controller, selecting a subsequent channel to be navigated to based on the data corresponding to prioritized list of one or more channels; and navigating to the selected channel.

Implementations of the invention may include one or more of the following. The prioritized list may contain only one channel. The using the received or retrieved guide data may include using the guide data at least in part to determine if: a user has at a prior time viewed a portion of a content item on a channel during channel surfing and has not dwelled on the channel displaying the content item for more than a predetermined time; and the content item is being displayed at a current time; and if the above two conditions are met, the channel may be removed from the prioritized list until a new content item is being displayed by the channel. The using the received or retrieved guide data may include using the guide data to determine if: a user has at a prior time viewed a content item; and the content item is being displayed at a current time; and if the above two conditions are met, a channel displaying the content item may be removed from the prioritized list until a new content item is being displayed by the channel. The using the received or retrieved guide data may include using the guide data to determine a collection of channels, the collection grouped by a common theme, and ordering the prioritized list such that channels within the collection are channel surfed consecutively. The method may further include: receiving user input about a desired theme; and ordering the prioritized list such that channels in the collection are higher in the list than channels not in the collection. The theme may be a genre, may correspond to a series of episodic content, may correspond to a series of movies, or the like. The receiving or retrieving guide data may include receiving metadata transmitted from the network server sourcing the channel or obtained through a server corresponding to a third-party source.

In other aspects, the invention is directed towards a non-transitory computer readable medium, including instructions for causing a computing environment to perform the above methods. In yet other aspects, the invention is directed towards a controller configured to perform the above methods, including where the controller is configured to receive a "next channel" or a "commercial" signal from a remote control.

Advantages of the invention may include, in certain embodiments, one or more of the following. Viewers are presented when channel surfing with the most popular channels or with channels most likely to have content of interest. By starting with popular channels, the viewer is more likely to quickly reach programming they desire to watch, thus missing less of such programming. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

Figure 1:
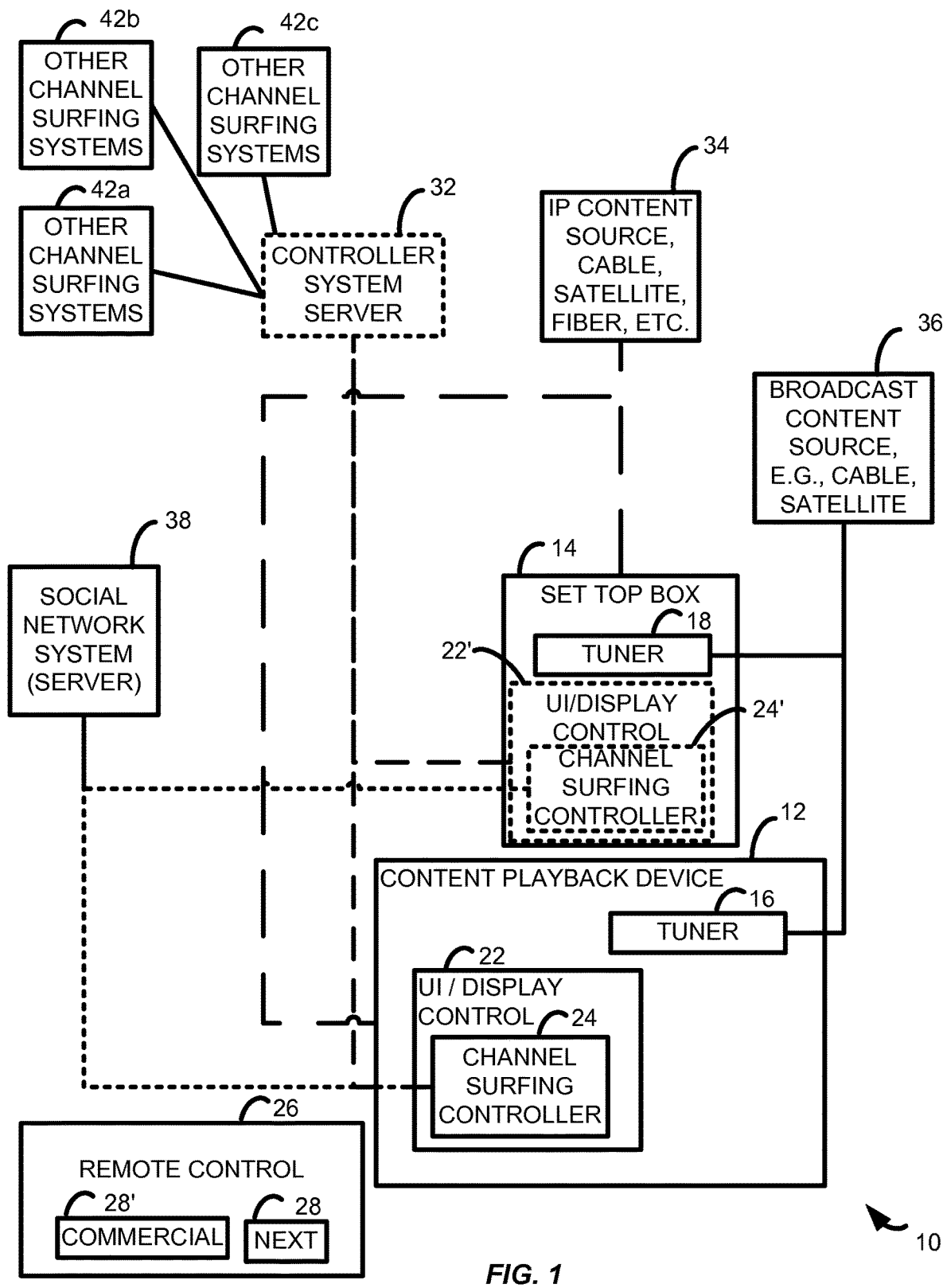
FIG. 1 illustrates a schematic diagram of a system for channel surfing according to present principles.

FIG. 1 illustrates a system 10 for channel surfing according to present principles. In the figure, a content playback device 12 is illustrated such as a television, e.g., an IPTV. The content playback device 12 may be in signal communication with a broadcast content source 36, e.g., a cable network, a satellite network, or the like. The content playback device may further be in signal communication with an IP content source 34, which may also include cable networks, satellite networks, fiber networks, and so on. The content playback device 12 may employ a tuner to allow reception of digital television channels, and the term is used broadly here to include any device that allows and enables content from a desired channel to be output to a display.

In some cases, instead of within the content playback device 12, content is received at a set top box 14, which may also have a tuner 18. The set top box 14 may then transmit received content to be displayed to the content playback device 12. In some implementations the content playback device will perform steps according to present principles, and in other cases a set top box may. In yet other cases, a channel surfing controller, channel controller, or just "controller" according to present principles may be implemented as part of a remote control, or as part of a user interface of a device acting as a remote control, e.g., a smart phone, tablet, laptop, or the like. Yet other variations will also be understood.

As noted, the content playback device 12 may have a channel surfing controller 24 which forms a portion or a module within an overall UI/display control 22. More particularly, the channel surfing controller 24 performs functions as described in flowcharts described here, including flowcharts of FIGS. 3-7, and generally determines a subsequent channel to be "surfed" to during a process of "channel surfing". In this specification the term "channel surfing" is used to mean a process whereby a user views multiple channels sequentially by stopping for a short period of time on each one, generally until the user finds a channel they wish to view.

The surfing may be accomplished by clicking or activating a "channel up" or "channel down" button on a remote control, or by means of a special button dedicated to channel surfing. Alternatively, the functionality of the channel up and channel down buttons may be repurposed when in a channel surfing mode.

The channel surfing controller 24 is activated during this process, and generally determines a next or subsequent channel to surf to. The next channel may be based on numerous factors as described herein, and may be based in addition on more traditional factors as the next channel in a numerical list of channels. The channel surfing controller 24 may also be employed to allow the user to surf back to a previous or prior channel, rather than a subsequent one.

While a channel surfing controller 24, formed as part of a UI/display control 22, is illustrated in FIG. 1 as being part of the content playback device, it will be understood that a channel surfing controller 24' may be formed as part of a UI/display control 22' within the set top box 14 as well. Either may employ button activations from a remote control 26, e.g., a "next channel" button 28 or a "commercial" button" 28', as are described in greater detail below. Such buttons may also be virtual and/or may constitute repurposing of current buttons to operate in a "channel surfing" mode.

The remote control 26 may be part of a mobile device such as a smart phone, tablet computer, or the like, or the user may simply operate controls on the content playback device or set top box itself. In some implementations, the controller may be formed as part of a controller system server 32 in network communication with the content playback device 12 or the set top box 14. In this case, user indications (e.g., next channel, etc.) may be transmitted over a network to the controller system server 32 which in turn controls the channel tuned to by the content playback device 12 (or set top box 14) or which controls delivery of content on a desired channel (from a content source) to the content playback device 12 or set top box 14.

FIG. 1 also illustrates a number of other channel surfing systems 42a-42c, which represent system similar to system 10. In this way, the figure represents that data may influence the operation of the channel surfing controller 24, where such data arrives from other systems located around the network. In other words, other users' actions can influence the operation, in some implementations, of the channel surfing controller 24.

The same is true of data from a social network server 38. As will be described, action such as comments or hash tags from users may influence the operation of the channel surfing controller 24. Such influences are generally on the basis of multiple users connected potentially around the world, and so the technology of the network communication, as well as the processing of the signals corresponding to the inputs of other users, may play a key role in certain implementations. And the same is true from signals of the systems 42a-42c. In many cases such other systems will connect to a subject channel surfing controller 24 through a controller system server 32, but it will also be understood that the same may connect more directly, not through a server, as well as through various other types of heterogeneous networks.

Figure 2:
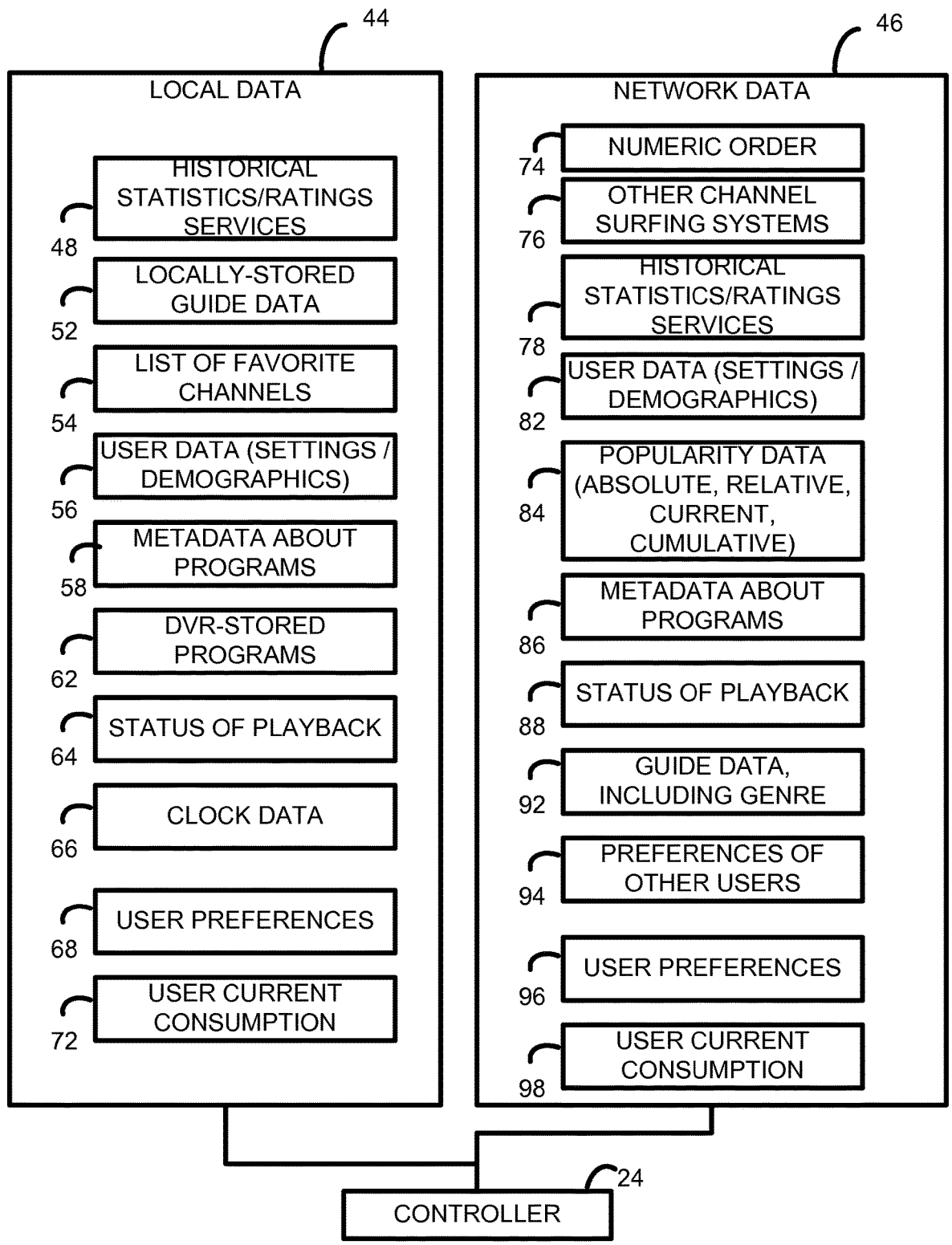
FIG. 2 is a diagram showing types of local and network data which may be employed by a channel surfing controller according to present principles.

FIG. 2 illustrates a logical diagram 20 in which various types of local data 44 and network data 46 are shown as inputs to the channel surfing controller 24. As will be seen, certain types of data may be either locally stored or network accessible, or both, such as a guide data, metadata about programs, and the like.

One type of data which may be employed by a controller 24 is popularity data 84. The popularity data 84 may pertain to the popularity of a channel, either a current popularity, i.e., how many users are currently watching the channel (at least as can be known from connected systems or other data), or an overall popularity as measured over a predetermined time, e.g., a television season, a month, a week, a day, an hour, or the like. The popularity data 84 may also pertain to the popularity of a particular content item being shown on a channel, irrespective of what channel is broadcasting the content item. Popularity data 84 relies on knowledge of other systems, although as noted such knowledge need not be contemporaneous, i.e., may be historical. The popularity data 84 may also be sourced from multiple sources, not just from the network sourcing the content. It is noted that when calculating popularity data, generally not counted are users who are watching a channel but have only been watching the channel for a short period of time, as such may be deemed to be channel surfing themselves. For example, if a user is on a channel for less than 5, 10, or 15 seconds, such may be deemed a channel surfer and not calculated into the controller system as contributing to the calculation of the popularity of any channel in particular. In this way, the popularity of channels can be adjusted in real time, which allows the popularity to reflect the actual content being shown by the channel at the time.

Another type of data which may be employed by the controller 24 is data about a status of playback of the content item, either status data 64, stored locally, or status data 88, accessed from a network source. In this regard it is noted that certain users may desire to not view content that is already half over, or that have passed some other stage in their delivery. Thus, the data 64 or the data 88 may be employed to affect channel surfing for such users, particularly as data to be compared to a user preference criteria noted above (user preference data is discussed in greater detail below). For example, such data may be employed to prioritize a channel surfing list such that channels that have started new programming are prioritized higher than those that have not. The determination of the commencement of new content, or the likelihood of such, may be based on clock data 66, as compared to guide data 52 or 92, as well as data 76 about other channel surfing systems. In particular, if a channel surfing controller detects a sudden increase in the number of people watching a channel, the same may infer that new content has recently begun.

As mentioned above, locally stored data 68 about user preferences, or network accessed data 96 about the same, may be employed by the controller 24 in the determination of a subsequent channel to be navigated to. The user preferences may include preferred genres, themes, or the like. Such may also include preferences for or against certain types of content. Preference information can be received via entry by the user, as well as by analysis of the user's viewing history or even third-party sources. Similarly, user data 56 may be employed, which includes data about, e.g., user settings and demographics. User data may also be network accessed, as user data 82. Where genre or theme is used in the determination of a channel surfing order, e.g., that of the prioritized list, it is noted that the same may be determined either by locally stored metadata 58 about programs, by network accessed metadata 86 about programs, or by aggregating content type preferences 94 of other users currently watching the channel. That is, by determining aspects of other users currently watching the channel, especially their interests, the genre of a show currently playing on the channel may be inferred.

Other types of data which may be employed include locally stored guide data 52 or network accessed guide data 92. As will be described in greater detail below with respect to FIG. 7, such guide data may be employed to determine if a user has already viewed a content item (and thus a channel showing such content item may be skipped in the prioritized list), or may be used as an indicator of a genre, or for other purposes. Moreover, when using channel surfing to navigate to a channel, guide data may be overlaid on the display of a current channel and employed to show information about the current channel, and the same can be augmented with information about what is playing on the next channel coming up in the channel surfing order, e.g., within a prioritized list of channels.

The popularity of a channel can further be based on historical statistics and/or ratings services, either as locally stored data 48 or network accessed data 78. In this way, channels that have been historically popular, or popular on the basis of ratings, may be ranked higher in the prioritized list. Such historical data may further include channels that the user watches a lot, as such may be increased in popularity even in the absence of an explicit notation by the user, e.g., addition to a favorites list.

Other data may include a user current consumption, which may be implemented via locally stored data 72 or network accessed data 98. For example, if a user is currently enjoying a certain type of content, channels showing similar content may be arranged higher in the prioritized list. Similarly, a list of favorite channels 54, or data 62 about programs stored on the user's DVR, may be used by the controller 24 in determining a subsequent channel, a next subsequent channel, or a prioritized list of channels to be surfed.

Finally, a numerical order 74 of the channels may be employed, although in alternative implementations random order may also be used, particularly to ensure that the user sees all channels with equal likelihood. Generally, the numerical order (or random distribution) will only be employed following the determination of a subsequent channel or prioritized list, and then only to choose a channel to display if all other aspects are equal. The determination of which types of data are employed for any given system may be set by the user, by a system default, or by a combination of such factors.

In related examples, the popularity calculations for channels can be partitioned for sets of users with commonalities, e.g., using popularity data 84 in combination with demographic data 56 or 82. Such commonalities may include age ranges, geography, or the like. In another implementation, the prioritization as well as aspects such as partitioning may be performed based on the set of channels available to viewers. Multiple factors can be used when establishing partitioning. Other factors will also be understood. For example, users may provide start ratings to one or more channels, indicating their interest in particular channels, or a favorites list may be employed for a similar purpose.

Figure 3:
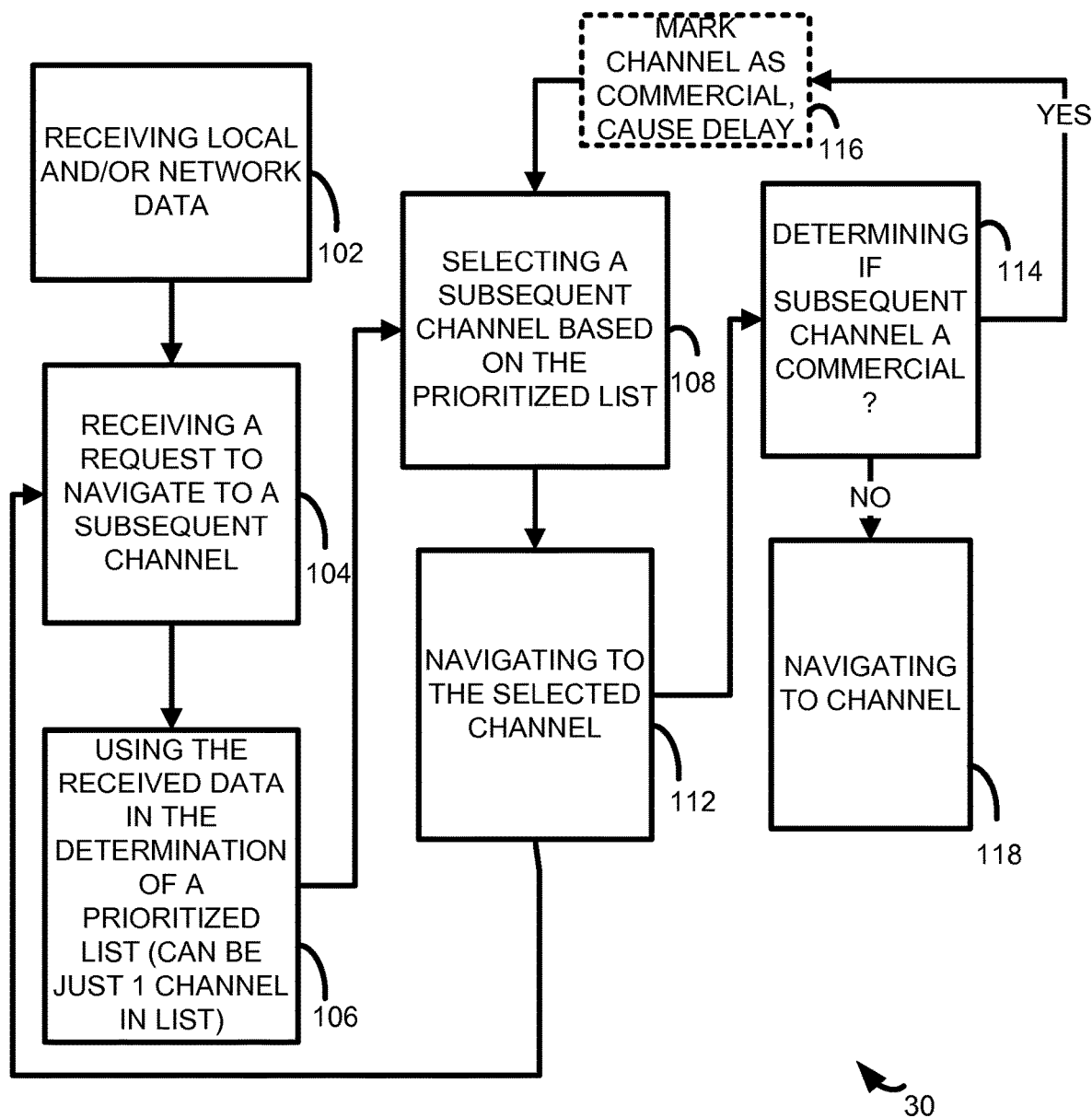
FIG. 3 is a flowchart illustrating a first method according to present principles.

Referring to the flowchart 30 of FIG. 3, a first step may be to receive local and/or network data (step 102). A subsequent step is to receive a request to navigate to a subsequent channel via channel surfing (step 104). Generally, steps 102 and 104 may be performed in any order. For example, for popularity-based surfing, data may be received in step 102 about popularity of various channels or content items. In step 104, the receiving a request to navigate to a subsequent channel may include receiving a button press from a user on a remote control indicating a desire to channel surf in a channel surfing mode provided by the controller 24.

Using the received data, a prioritized list is then determined (step 106). The prioritized list, which may include just a single channel, generally provides one or more channels which will be consecutively or sequentially navigated to upon command by the user, e.g., upon reception of a "next channel" or "subsequent channel" command or the like. As noted, the same may further be implemented by a "channel up" or "channel down" command from a remote controlled, operated in a channel surfing mode.

The method may then select a subsequent channel based on the prioritized list (step 108), e.g., the next channel in the list, and the selected channel may then be navigated to (step 112). The method may then repeat for subsequent channel surfing operations, starting at step 104.

In certain advanced implementations, channels showing commercials may be skipped or otherwise treated differently. For example, when navigating to a subsequent channel, a step may be performed of determining if the subsequent channel is showing a commercial (step 114). If not, the subsequent channel may be navigated to (step 118). However, if the subsequent channel is showing a commercial, then the subsequent channel may be skipped or otherwise marked as a commercial (step 116), and a next subsequent channel selected. In some cases, as described in greater detail below, not only is the subsequent channel skipped but the same is not returned to for a predetermined period of time, so as to allow the commercial to complete and content to be displayed prior to placing the channel back in the prioritized list or surfing lineup of channels.

Figure 4:
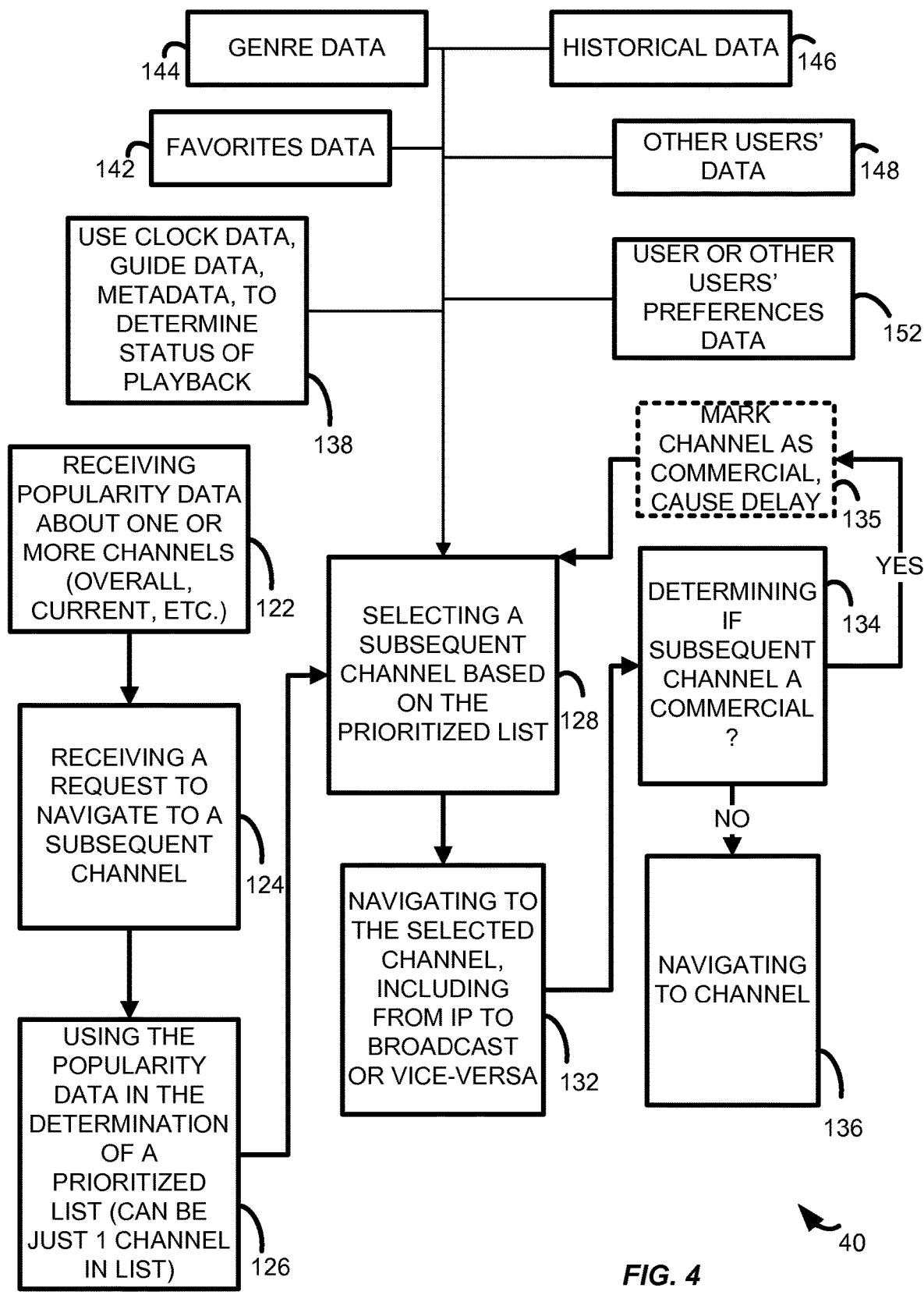
FIG. 4 is a flowchart illustrating a second method according to present principles.

FIG. 4 shows a more specific flowchart 40 detailing the use of popularity data in channel surfing. In a first step, popularity data is received about one or more channels (step 122). As noted, the popularity data may be associated with the channel, content being shown on the channel, or the like, and maybe a current popularity or an overall popularity based on a number of viewers over a predetermined time period. A request is then received to navigate to a subsequent channel (step 124). Using at least the popularity data, a prioritized list (which may be just one channel) is determined or developed (step 126). Other data may also be employed in the determination of the prioritized list. For example, data about favorites 142 may be employed, data about the genre 144, which may in turn be compared against user genre preference criteria, historical data 146 such as user viewing habits, data about other users 148, e.g., what other viewers are currently finding popular, as well as other preferences data 152 about the user or other users. Data 138 may further be employed, including clock data, guide data, metadata, so as to determine the status of playback of content items, and thus use the same in the determination of the prioritized list. For example, if a show is at its end, e.g., showing the credits, such may be skipped in the prioritized list. Moreover, certain other guide data may determine if a program should appear in the prioritized list. For example, if the guide data indicates that the show is a murder mystery, then such may be skipped if the show is at or near its end. Alternatively, if the show provides a more "horizontal"

delivery of content, e.g., humorous internet videos, then such guide data may suggest inclusion in the prioritized list even if the show is nearing its end.

In any case, once a subsequent channel is selected, the same is navigated to (step 132). As noted previously, steps may be performed of determining if the subsequent channel is showing a commercial (step 134), and if so, marking the same as a commercial (step 135) and skipping the same or performing other functionality as noted. If the same is not a commercial, then the channel may be navigated to (step 136).

The navigation from one channel to another using a controller 24 according to present principles may include navigating from an IP-based channel to a broadcast channel, or vice versa. Such is yet another benefit of the current system, in some implementations, where such transitions are seamless and transparent to the user.

Figure 5:
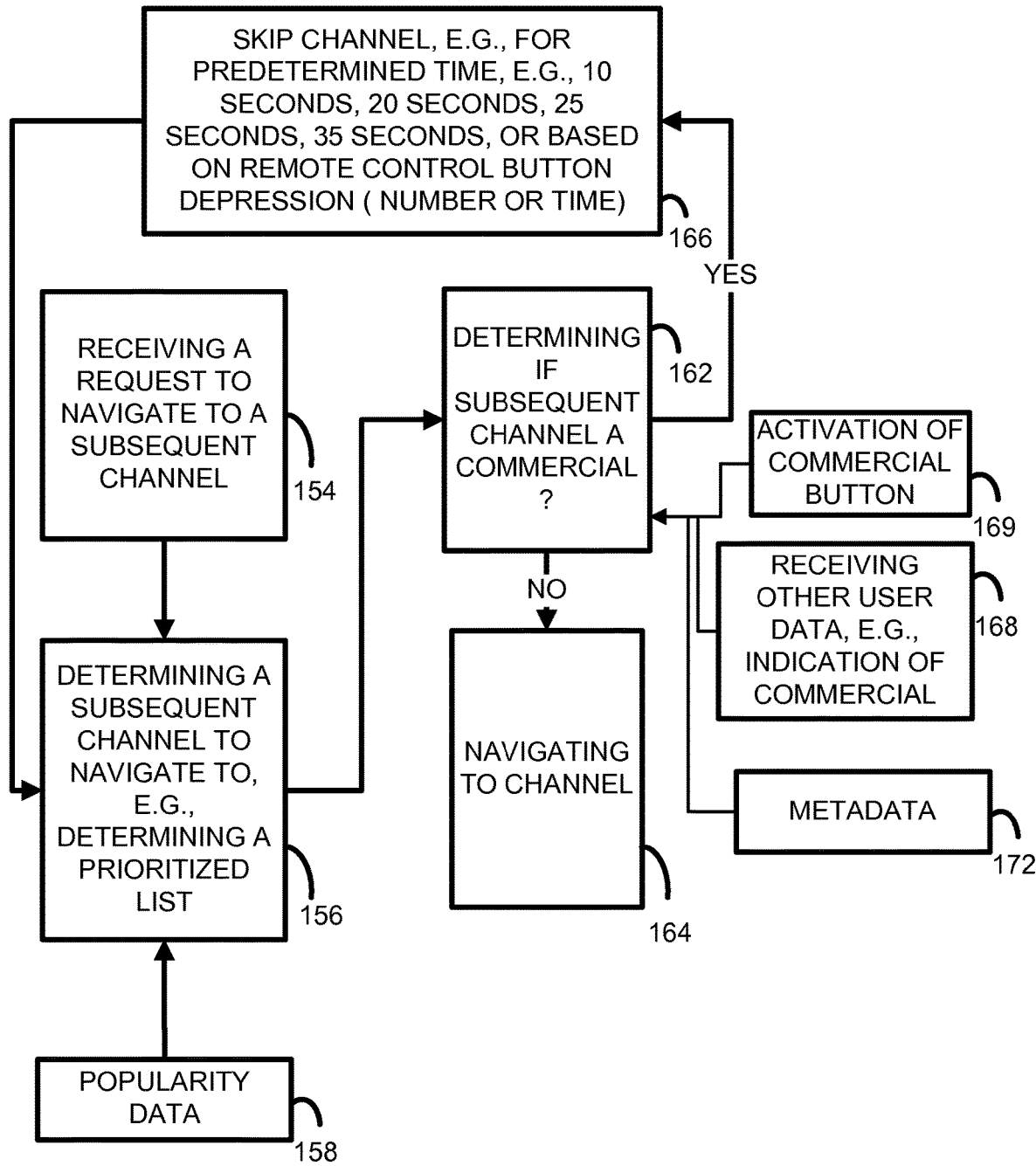
FIG. 5 is a flowchart illustrating a third method according to present principles.

Referring next to the flowchart 50 of FIG. 5, a more detailed method according to present principles is described, in particular for aspects of channel surfing across channels showing commercials. As noted above, if the channel is showing a commercial, the user generally cannot tell what programming or content is currently being shown. Put another way, viewing commercials does not provide information to the viewer to help them determine what channel to view. In certain implementations of systems and methods according to present principles, a button or other user interface element may be employed to allow and enable the user to surf to a next subsequent channel, and moreover may block surfing from stopping on a current channel, i.e., the channel showing the commercial, for a predetermined duration of time. In some cases a separate commercial button may be employed, and in other cases, the previously described "next channel" button (in surfing mode) may be employed. In the former case, the channel may be marked as showing a commercial because the user has provided such data via the button push, and the channel may be so marked regardless of other data present such as metadata which may also indicate the existence of a commercial on the channel. In such cases such data is redundant. In the latter case, the channel may be marked as showing a commercial generally only where additional data such as metadata indicates the existence of a commercial on the channel, because in these cases the user-entered data is not enough to unambiguously mark the channel as showing a commercial.

Variations will be understood. For example, a viewer pressing the "next channel" button for a longer or shorter period of time than usual may provide or constitute the added "additional data" that the viewer is watching a commercial on the current channel. In these cases, a shorter button press duration may be useful since a viewer may quickly come to the conclusion that a commercial is being viewed and is desired to be skipped (in many cases, when viewing content, the viewer may take a longer period of time to determine if the content is something they wish to watch).

The metadata noted above may be provided from paid programming being listed in a programming guide, metadata forming a part of the broadcast, metadata determined and/or received from an aggregate of other channel surfers who just pressed the commercial button (or other buttons as noted above) for the channel, or the like.

In a first step, a request is received to navigate to a subsequent channel (step 154). A subsequent channel is then determined to be navigated to (step 156). This step may include several of the techniques noted above, including using the determination of a prioritized list of channels which then provides an order or sequence for the channel surfing controller to progress through upon subsequent depressions of a "next channel" button.

The prioritized list, which again may constitute just one channel, may be determined on the basis of popularity data (step 158), or using other data as described above. A step is then performed of determining if the subsequent channel is a commercial (step 162). This step may be performed in a number of ways. First, prior to the actual navigation to the channel, metadata (step 172) and data from other systems (step 168), and the like, may be employed to determine if the subsequent channel is showing a commercial. Alternatively, the channel may be navigated to, and upon the depression of a "commercial" button (or other technique as described), the user may enter data indicating the channel is showing a commercial (step 169).

If the channel is showing a commercial, the channel may be skipped for a predetermined time (step 166). The predetermined time may be set by the system, e.g., 10 seconds, 20 seconds, 25 seconds, 35 seconds, or the predetermined time may be based on user input, e.g., corresponding to the particular commercial button pressed (if multiple options are present), or alternatively on a duration of a button press, use of a slider, or other techniques. If the channel is not showing a commercial, the channel may be navigated to (step 164).

In variations of the method of FIG. 5, the commercial button (or other such) may be employed to skip over portions of a non-commercial program or content item for which a user is unsure whether to watch during channel surfing. For example, if the program is showing a dream sequence, the user may not be able to decide on the basis of what is seen whether they wish to view the channel further. Accordingly, the commercial button may be employed to allow the user to come back to the channel after a short period of time. In other variations, double-clicking the commercial button may be employed to indicate that a different duration of the predetermined time of step 166 should be used, and the different duration may be predetermined, may be based on a slider control, a default, another button press, or the like. Channels skipped over in this fashion may be then, following the expiration of the predetermined time period, placed higher in the prioritized list than otherwise, as the user is assumed to have not had the opportunity to view the content on the channel previously.

Figure 6:
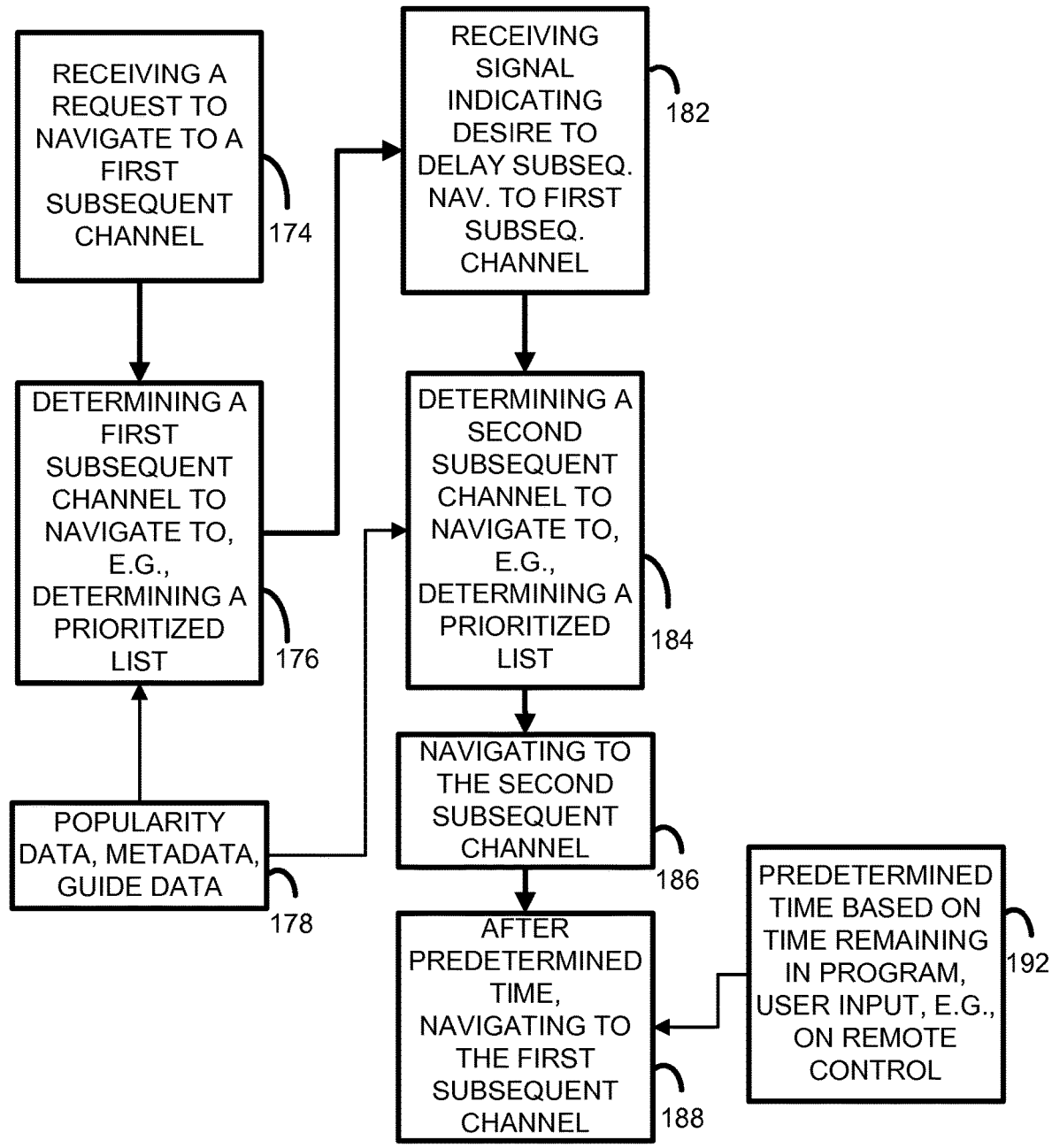
FIG. 6 is a flowchart illustrating a fourth method according to present principles.

The flowchart 60 of FIG. 6 shows a flowchart implementing another method according to present principles. In a first step, a request is received to navigate to a first subsequent channel (step 174). As before, a first subsequent channel is determined, e.g., by the determination of a prioritized list (step 176). It will be understood that the prioritized list may be determined "on the fly", or even before a request is received for channel surfing.

In the determination of the prioritized list, various data as described above may be employed, e.g., popularity data, metadata, guide data, data from other users of channel surfing systems, and the like (step 178).

A signal is then received indicating a desire to delay subsequent navigation to the first subsequent channel (step 182). This signal is in many cases received after navigation has occurred to the first subsequent channel, particularly if the user has noted that he or she is not interested in viewing the content. However, in some cases, data about a subsequent channel may be shown on a currently viewing channel, i.e., on the channel viewed prior to the subsequent channel. This data about a subsequent channel may include a preview, metadata such as a program name, genre data, or the like.

In any case, a second subsequent channel to navigate to is then determined, and the determination of such may be in the same way as the determination of the first subsequent channel (step 184). However, generally the first subsequent channel will be removed from the prioritized list, until such time as the first subsequent channel is showing new content (this setting may be modified by the user). The second subsequent channel may then be navigated to (step 186).

After a predetermined time, the first subsequent channel may be navigated to, or more particularly placed back into the prioritized list for subsequent navigation in turn upon depression of a "next channel" button (step 188). In this case, the predetermined time may be based on the time remaining in the program or content item being watched at the time of occurrence of step 182, or upon user input, e.g., a user indication of a desire to put the channel back in the prioritized list or channel surfing line up (step 192).

Figure 7:
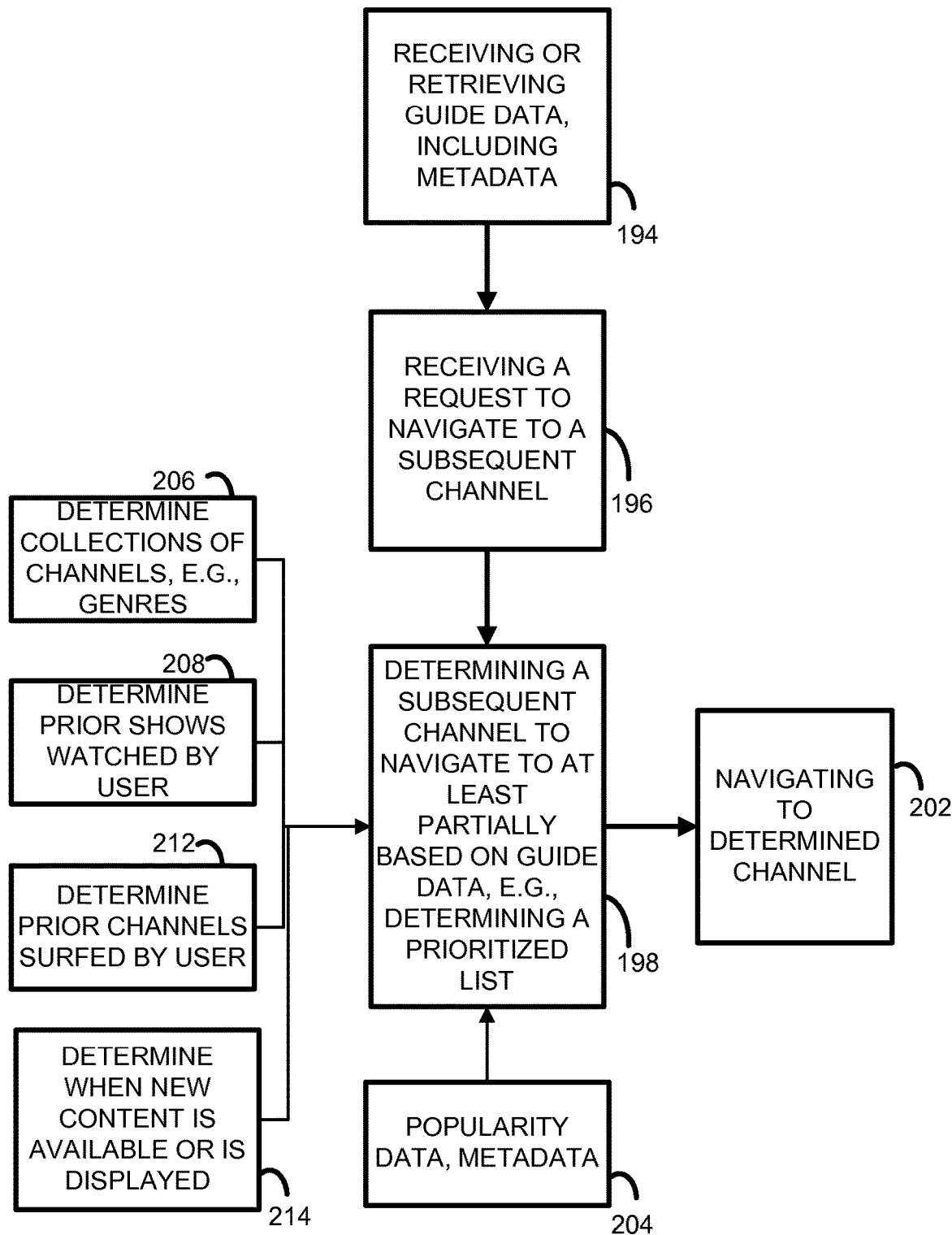
FIG. 7 is a flowchart illustrating a fifth method according to present principles.

Further ways to improve channel surfing may include the method 70 of FIG. 7, which may be employed alone or in combination with the methods of the previously described flowcharts. In particular, FIG. 7 describes ways of improving the experience of channel surfing by taking advantage of available guide data. For example, guide data may indicate when the programming being shown by a channel is content that the viewer has already skipped while channel surfing. Guide data may further be used to determine that a genre of content being played by one or more channels may be preferentially skipped or navigated to while channel surfing. Such may be particularly helpful when the channels are aligned with data about viewers' preferences and mood. The use of guide data may further be employed to extend determinations made about specific channels to other like channels, similarities between channels being determined on the basis of guide data, metadata, or the like.

In this regard it is noted that guide data, such as programming metadata, is typically available in cable and satellite systems. For example, broadcast stations generally at least include metadata about the programming title and remaining time for the content they are broadcasting. Existing channel surfing, i.e., by clicking "channel up" or "channel down" buttons, currently does not take advantage of such programming data.

Thus, in a first step, guide data may be received or retrieved (step 194), and such guide data may include metadata. A request may then be received to navigate to a subsequent channel (step 196), e.g., by techniques noted above. A subsequent channel is then determined to be navigated to (step 198). For example, this determination may be based at least partially on the guide data, and the determination may constitute the construction of a prioritized list as described above. The prioritized list may be further based on popularity data, metadata, or other factors as described above.

The determination of the subsequent channel based on the guide data may include using guide data of various forms and types. For example, guide data may be employed to determine a collection of channels grouped in some way (step 206), e.g., genre, a favorite actor, or the like. Guide data may also be employed to determine prior shows watched by the user (step 208), e.g., by comparing a user consumption history with metadata about current shows being broadcast. Thus, guide data may be employed to allow and enable skipping of channels while channel surfing that are showing the same or similar content as the viewer previously skipped over, either on the same channel or on a different channel. Guide data may further be employed to determine prior channels surfed by the user (step 212).

Guide data may even further be employed to determine when new content is available or is displayed (step 214), e.g., by determining when new shows are being broadcast (or are scheduled to be broadcast). Other variations of using guide data will be understood, as will combinations of such ways of using guide data. For example, guide data may be employed to skip a channel where the channel is showing different episodes of a show that were previously skipped over. Skipping different episodes may be by default, or the same can be set by the user as a special mode by activation of a UI element, e.g., a special type of button push, a different button, or other means.

Similar methods may be employed to skip over channels showing similar content skipped over in a previous channel surfing session. Guide data may further be employed to, especially where users are particularly interested in a certain genre of content, to group all channels together in the prioritized list, where the grouped channels have metadata indicating a common genre, subject, or theme (or other common aspect). Where a user has entered a desired theme or genre, such may not only be grouped but may also appear first in the prioritized list. Users may also clear the data employed as guide data, e.g., reset the same, so as to not use a list of previous content (or channel surfing/skipping data) for a current channel surfing session.

Guide data as described above may be obtained through metadata transmitted by the channel or can also be obtained through third-party sources.

What has been described are systems and methods relating to systems and methods for providing channel surfing functionality in which a user is more likely to find channels of interest than in the past. In such systems and methods, the computing environment may operate more efficiently and may allow a user to watch desired content more rapidly, as determinations about channels to display to a user are made dynamically, on-the-fly, in real time, using potentially both historical and contemporaneous data. Determinations about channels to show first, or an order of channels to show, may include using bases such as channel popularity, prior user viewing history, contemporaneous input from multiple other users, whether the channel is displaying live content, and the like. Additional variations and implementations are also possible. For example, filters may be enabled and employed to act as overlays to only show a user programs of particular interest at that point in time. Systems and methods according to present principles may be employed with broadcast sources such as cable and satellite, as well as IP sources such as Netflix®, Crackle®, Hulu®, and so on. Various user inputs are described above, such as the detection of multiple users skipping a channel at a particular time, but it will be understood that other user inputs are possible, including multiple users entering desired channels at a particular time. Beside shows currently being broadcast or available from IP content sources, the system may further be employed to add programs into a prioritized list where such programs are currently stored on the user's DVR or other such local storage. The prioritized list may even further be extended to items in a playlist associated with a content source, e.g., items the user has marked to watch but which are not currently being broadcast (but are available on demand through the content source). In some advanced implementations of systems and methods according to present principles, the system may note channels that the user dwells on for a time period greater than a predetermined time period, e.g., channels the user appeared to show interest in, but which were subsequently skipped over. Such channels may be put back into the prioritized list, or may be put back into the list after a predetermined period of time.

Accordingly, the techniques are not limited to the specific examples described above.

One implementation includes one or more programmable processors and corresponding computer system components to store and execute computer instructions, such as to provide the channel surfing functionality within a controller. One such computing environment is disclosed below.

Figure 8:
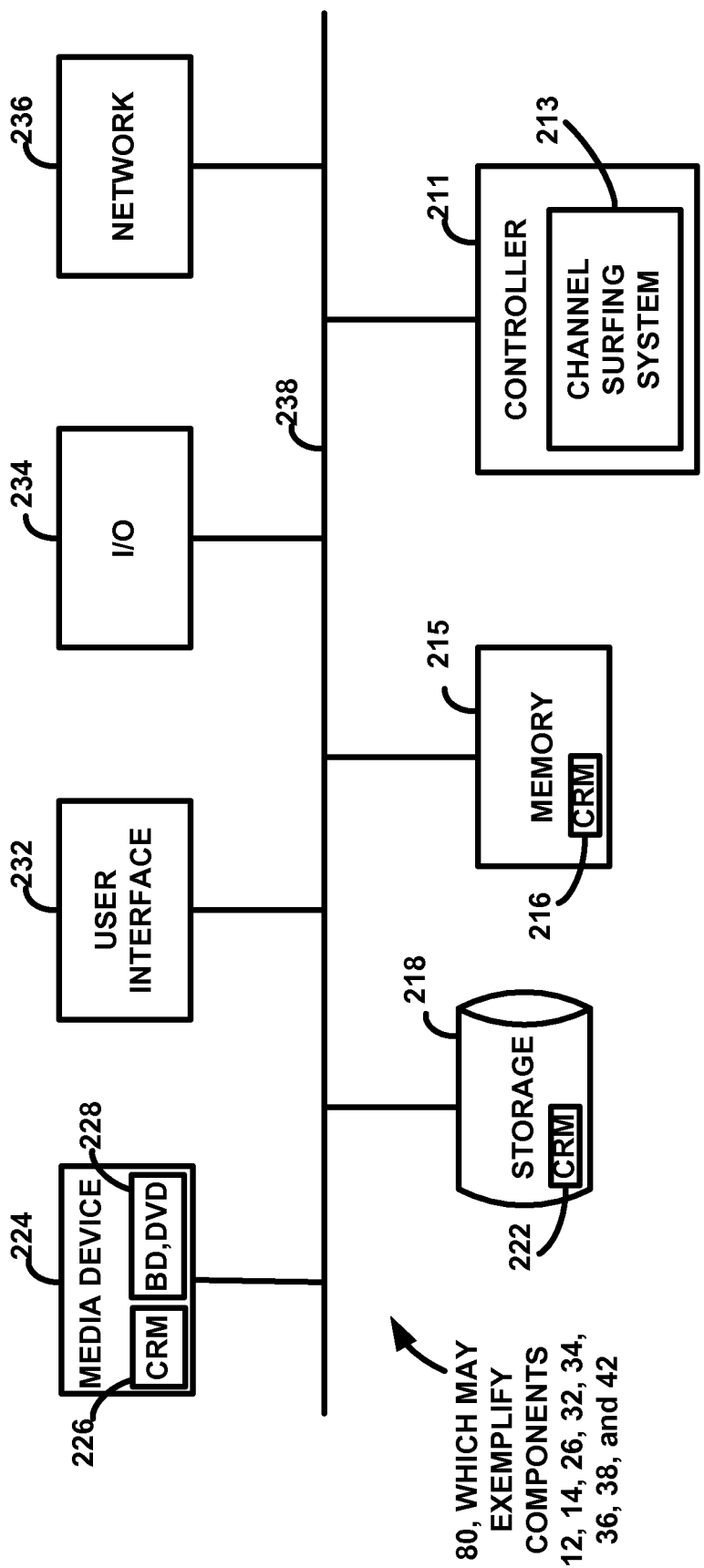
FIG. 8 illustrates an exemplary schematic computing environment which may be employed as certain of the components described.

Referring to FIG. 8, a representation of an exemplary computing environment 80 is illustrated as an example of how one or more systems according to present principles may be implemented. These systems may include, e.g., components indicated herein by reference numerals 12, 14, 26, 32, 34, 36, 38, and 42. Generally, the use of retrospective data, both locally stored and network accessible, as well as the use of real-time data collection to make determinations of subsequent channels based on, e.g., popularity data, require the use of such connected computing environments to perform the methods of the flowcharts described, e.g., flowcharts 3-7.

The computing environment 80 includes a channel controller 211, a memory 215, storage 218, a media device 224, a user interface 232, an input/output (I/O) interface 234, and a network interface 236. The components are interconnected by a common bus 238. Alternatively, different connection configurations can be used, such as a star pattern with the controller at the center.

The controller 211 includes a programmable processor and controls the operation of a channel surfing controller 213. The controller 211 loads instructions from the memory 215 or an embedded controller memory (not shown) and executes these instructions to control the system.

Memory 215, which may include non-transitory computer-readable memory 216, stores data temporarily for use by the other components of the system. In one implementation, the memory 214 is implemented as DRAM. In other implementations, the memory 214 also includes long-term or permanent memory, such as flash memory and/or ROM.

Storage 218, which may include non-transitory computer-readable memory 222, stores data temporarily or long-term for use by other components of the system, such as for storing data or instructions. In one implementation, the storage 218 is a hard disc drive, a solid state drive, or cloud storage.

The media device 224, which may include non-transitory computer-readable memory 226, receives removable media and reads and/or writes data to the inserted media. In one implementation, the media device 224 is an optical disc drive or disc burner, e.g., a writable Blu-ray® disc drive 228.

The user interface 232 includes components for accepting user input, e.g., the user activation of controls and buttons on a remote control, content playback device, set top box, or the like. The controller 211 uses inputs entered by the user to adjust the operation of the computing environment.

The I/O interface 234 includes one or more I/O ports to connect to corresponding I/O devices, such as external storage or supplemental devices. In one implementation, the ports of the I/O interface 234 include ports such as: USB ports, PCMCIA ports, serial ports, and/or parallel ports. In another implementation, the I/O interface 234 includes a wireless interface for wireless communication with external devices. Where a controller is implemented in the fashion of the computing environment 80, the I/O interface 234 may provide an output to a tuner or other device or circuit responsible for changing the channel on a television, e.g., an IPTV, in response to a "next channel" or "surfing" button, or other buttons as noted elsewhere.

The network interface 236 allows connections with the local network and includes a wired and/or wireless network connection, such as an RJ-45 or Ethernet connection or Wi-Fi interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or WiFi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the above system where channel surfing is contemplated, the plural inputs may allow plural users to input relevant data at the same time.

As it is understood that embodiments other than the specific embodiments described above may be devised without departing from the spirit and scope of the appended claims, it is intended that the scope of the subject matter herein will be governed by the following claims.

The invention claimed is:

1. A method of providing a channel surfing functionality in which a channel controller controls a subsequent channel to be presented to a user when the user is channel surfing, comprising:
    a. during playback of streaming data on a content playback device, receiving at a channel controller popularity data about absolute or relative popularity of one or more channels constituting streaming data available to a user when channel surfing, the popularity data based on an overall number of users currently watching the one or more channels as determined while the channel is displaying a given content item;
    b. receiving data at the channel controller, the data constituting a request to navigate to a subsequent channel on the content playback device, the subsequent channel streaming data for playback on the content playback device;
    c. within the channel controller, using the received popularity data in the determination of data constituting a prioritized list of one or more channels, whereby the data constituting the prioritized list of one or more channels describes data about an order of channels determined to be of likely interest of a user, further comprising basing an order of the prioritized list on a selected content type, wherein the user is currently watching a channel, and further comprising receiving data at the channel controller about content preferences of other viewers watching the currently watched channel, and wherein the content type is determined by aggregating content type preferences of the other viewers watching the currently-watched channel;
    d. within the channel controller, selecting a subsequent channel to be navigated to based on the prioritized list of one or more channels; and
    e. using the channel controller, navigating to the selected channel and displaying streaming data associated with the selected channel on the content playback device.

2. The method of claim 1, wherein the prioritized list contains only one channel.

3. The method of claim 1, wherein the popularity data is based on an overall popularity of the channel over a period of time.

4. The method of claim 1, further comprising, within the channel controller, basing a calculation of the order of the prioritized list at least partially on a status of playback of content items being displayed by the respective channels, wherein the status of playback is at least partially based on
    a. metadata about a time remaining or time elapsed in the playback of the content item; or
    b. an indication from a server that an overall number of systems viewing the channel has increased by at least a predetermined percentage.

5. The method of claim 1, wherein the navigating includes navigating from a cable, satellite, or over-the-air broadcast channel to a streaming internet channel or vice versa.

6. The method of claim 1, wherein the user is currently watching a channel, and further comprising overlaying information about a subsequent channel in the prioritized list.

7. The method of claim 1, wherein the popularity data is based on historical statistics data or ratings services data, or on data received from a social networking site.

8. The method of claim 1, further comprising receiving user preferences data at the channel controller, and basing an order of the prioritized list at least partially on the user preferences data, wherein the user preferences data include one or more selected from the following group:
    a. a user indication of a desire to not channel surf to channels playing a content item past a predetermined point in the duration of the content item;
    b. or
    c. a user indication of a desire to not see content items of a predetermined genre.

9. The method of claim 8, wherein the user preferences data is determined by user content consumption analysis data, including data based on an analysis of channels frequently watched by the user.

10. The method of claim 1, wherein if the subsequent channel is displaying a commercial, then further comprising skipping the subsequent channel and determining a next subsequent channel to navigate to, and repeating the steps of:
    a. determining if the next subsequent channel is displaying a commercial; and
    b. if the next subsequent channel is not displaying a commercial, then navigating to the next subsequent channel.

11. The method of claim 1, wherein the popularity data is received from a server coupled to other systems running a method of providing channel surfing functionality.

12. A controller configured to perform the method of claim 1, where the controller is configured to receive a "next channel" signal from a remote control.

13. A method of providing a channel surfing functionality in which a channel controller controls a subsequent channel to be presented to a user when the user is channel surfing, comprising:
   a. during playback of streaming data on a content playback device, receiving data at a channel controller, the data corresponding to a request to navigate to a subsequent channel;
   b. at the channel controller, determining a subsequent channel to be navigated to, the determining including receiving popularity data about a subsequent channel, and basing the determining of a subsequent channel to navigate to at least in part on the popularity data, wherein the popularity data is based on an overall number of users currently watching the subsequent channel as determined while the channel is displaying a given content item;
   c. at the channel controller, receiving data about the determined subsequent channel, and using the received data about the subsequent channel to determine if the subsequent channel is displaying a commercial; and
   d. if the subsequent channel is not displaying a commercial, then navigating to the subsequent channel, and if the subsequent channel is displaying a commercial, then skipping the subsequent channel and determining a next subsequent channel to navigate to, and repeating the steps of: determining if the next subsequent channel is displaying a commercial; and if the next subsequent channel is not displaying a commercial, then navigating to the next subsequent channel, wherein the determining if the subsequent channel is displaying a commercial includes determining if a predetermined proportion of other users indicated that the subsequent channel is displaying a commercial.

14. The method of claim 13, wherein the basing further comprises:
   a. receiving popularity data about absolute or relative popularity of one or more channels available to a user when channel surfing;
   b. using the received popularity data in the determination of a prioritized list of one or more channels, whereby the prioritized list of one or more channels describes a list of channels in an order determined to be of likely interest of a user;
   c. wherein the determining of a subsequent channel to navigate to is based at least in part on the prioritized list of one or more channels.

15. The method of claim 13, wherein the determining if a predetermined proportion of other users indicated that the subsequent channel is displaying a commercial includes determining if a predetermined number, percentage, ratio, or proportion of other users indicated a commercial on the subsequent channel.

16. The method of claim 13, further comprising receiving metadata associated with the channel displaying a commercial at the channel controller and wherein the determination of the next subsequent channel is at least in part based on the received metadata, wherein the receiving metadata includes receiving metadata from a source selected from the group consisting of:
   a. a network source including a program listing in a programming guide;
   b. a network source sourcing a broadcast signal associated with the channel;
   c. at least one network source providing aggregate data from a subset of other users, the subset defined by other users who skipped over the channel; or
   d. combinations of the above.

17. A controller configured to perform the method of claim 13, wherein the controller is configured to receive a "next channel" signal from a remote control.

* * * * *